(12) United States Patent
An

(10) Patent No.: US 10,520,773 B2
(45) Date of Patent: Dec. 31, 2019

(54) LIQUID CRYSTAL DISPLAY PANEL AND LIQUID CRYSTAL DISPLAY

(71) Applicant: SHENZHEN CHINA STAR OPTOELECTRONICS TECHNOLOGY CO., LTD., Shenzhen, Guangdong (CN)

(72) Inventor: Liyang An, Guangdong (CN)

(73) Assignee: SHENZHEN CHINA STAR OPTOELECTRONICS TECHNOLOGY CO. LTD., Shenzhen, Guandong (CN)

(*) Notice: Subject to any disclaimer, the term of this patent is extended or adjusted under 35 U.S.C. 154(b) by 0 days.

(21) Appl. No.: 15/564,131

(22) PCT Filed: Apr. 18, 2017

(86) PCT No.: PCT/CN2017/080928
§ 371 (c)(1),
(2) Date: Oct. 3, 2017

(87) PCT Pub. No.: WO2018/161409
PCT Pub. Date: Sep. 13, 2018

(65) Prior Publication Data
US 2018/0259800 A1    Sep. 13, 2018

(30) Foreign Application Priority Data

Mar. 8, 2017  (CN) .......................... 2017 1 0135380

(51) Int. Cl.
*G02F 1/1339* (2006.01)
*G02F 1/1335* (2006.01)
*G02F 1/1343* (2006.01)
*G02F 1/1337* (2006.01)
*G02F 1/13357* (2006.01)

(52) U.S. Cl.
CPC .......... *G02F 1/1339* (2013.01); *G02F 1/1343* (2013.01); *G02F 1/13394* (2013.01); *G02F 1/133512* (2013.01); *G02F 1/133602* (2013.01); *G02F 2001/13373* (2013.01)

(58) Field of Classification Search
CPC ............. G02F 1/1339; G02F 1/133512; G02F 1/133602; G02F 1/1343; G02F 1/13394; G02F 2001/136222
See application file for complete search history.

(56) References Cited

U.S. PATENT DOCUMENTS

| | | | |
|---|---|---|---|
| 2009/0190084 A1* | 7/2009 | Sun | G02F 1/13394 349/157 |
| 2013/0222723 A1* | 8/2013 | Kim | H01L 33/58 349/40 |

* cited by examiner

*Primary Examiner* — Nathanael R Briggs

(57) ABSTRACT

A liquid crystal display panel and a liquid crystal display are disclosed. The liquid crystal display panel includes a color film substrate and an array substrate disposed opposite each other, wherein the array substrate includes a pixel electrode, a color resistance layer, and a thin film transistor, the color resistance layer is provided with a through hole, a drain of the thin film transistor is connected with the pixel electrode through the through hole, and a region corresponding to the through hole is provided with a spacer for separating liquid crystal molecules in the region where the through hole is located from liquid crystal molecules in a region where the electrodes are located.

11 Claims, 4 Drawing Sheets

LIQUID CRYSTAL DISPLAY PANEL AND LIQUID CRYSTAL DISPLAY

FIELD OF THE INVENTION

The present disclosure relates to the technical field of displays, and particularly to a liquid crystal display panel and a liquid crystal display.

BACKGROUND OF THE INVENTION

With the introduction of large-size liquid crystal display panels, liquid crystal display panels must have wide viewing angle characteristics to meet the needs of use. Therefore, multi-domain vertical alignment (MVA) liquid crystal display panels with wide viewing angle characteristics have become the mainstream products of large-size flat display panels.

The array substrate of the vertical aligned liquid crystal display panel has a patterned pixel electrode, and the color filter substrate typically contains a plurality of bumps corresponding to the center position of the pixel electrode. Through the fringe electric field effect of the pixel electrode and the tilting orientation of the liquid crystal molecules induced by the geometry of the bumps, the negative liquid crystal molecules tilt down when the voltage is applied to the pixel, and the different display domains are created based upon the tilting orientation of the liquid crystal molecules, in order to obtain wide viewing angle characteristics.

For a conventional Color On Array product (COA), the pixel electrode P is connected to the drain D via a connecting body (e.g., an extension P1 of the pixel electrode) through a through hole H. Structurally, the color resistance layer is between the drain layer and the pixel electrode layer. In order to ensure that the conduction between the drain and the pixel electrode, the color resistance layer near the through hole is removed to form a color film hole region K. The color resistance layer is thick, so the terrain of the color film hole region is like a large cave, and the liquid crystal molecules accumulate here. Since the extension P1 of the pixel electrode P is relatively narrow in shape, after being charged, the direction of the electric field formed between it and the upper plate is divergent. Due to the collective effect of the extension P1 of the pixel electrode and the color film hole area K, when the panel is tapped, the liquid crystal molecules in the color film hole region are more likely to be tilted (see FIGS. 1A, 1B, and 1C), while the adjacent liquid crystal molecules affect each other, and the dark shade are generated.

The shape of the dark shade is typically from the color film hole region to the center of the pixel electrode, and easily causes image retention (IR) when an image is displayed, thus affecting the display quality.

As a result, the prior art is defective and needs to be improved.

SUMMARY OF THE INVENTION

A primary object of the present disclosure is to provide a liquid crystal display panel and a liquid crystal display which are intended to solve the problem in the prior art that when the panel is tapped, the liquid crystal molecules in the hole region in the color film are tilted, thereby generating dark shade.

In order to solve the above-mentioned problems, the technical solution provided by the present disclosure is as follows:

In the present disclosure, a liquid crystal display panel is provided, which includes a color film substrate and an array substrate disposed facing each other, wherein the array substrate includes a pixel electrode, a color resistance layer, and a thin film transistor, the color resistance layer is provided with a through hole, a drain of the thin film transistor is connected with the pixel electrode through the through hole, and a region corresponding to the through hole is provided with a spacer which is configured to separate liquid crystal molecules in the region where the through hole is located from liquid crystal molecules in a region where the pixel electrode is located.

In the liquid crystal display panel in the present disclosure, the spacer is disposed on a side of the color film substrate corresponding to a periphery of the through hole and facing the pixel electrode.

In the liquid crystal display panel in the present disclosure, the spacer has a straight bar-like structure.

In the liquid crystal display panel in the present disclosure, the spacer has a structure of a curved surface.

In the liquid crystal display panel in the present disclosure, the spacer is a hollow cylindrical structure surrounding the through hole, and an inner diameter of the cylindrical structure is larger than a diameter of the through hole.

In the liquid crystal display panel in the present disclosure, the spacer is a hollow columnar structure surrounding the through hole, an area of an top surface of the columnar structure is different from an area of a bottom surface of the cylindrical structure, and a minimum inner diameter of the cylindrical structure is larger than a diameter of the through hole.

In the liquid crystal display panel in the present disclosure, the spacer is a box-shaped structure surrounding a periphery of the through-hole.

In the liquid crystal display panel in the present disclosure, the box-shaped structure is defined by four sides, and the four sides include the side facing the pixel electrode and the other three sides each having a hollow structure.

In the liquid crystal display panel in the present disclosure, the spacer is disposed on the array substrate.

In the present disclosure, a liquid crystal display panel is provided, which includes a color film substrate and an array substrate disposed opposite each other, wherein the array substrate includes a pixel electrode, a color resistance layer, and a thin film transistor, the color resistance layer is provided with a through hole, a drain of the thin film transistor is connected with the pixel electrode through the through hole, and a region corresponding to the through hole is provided with a spacer, which is configured to separate liquid crystal molecules in the region where the through hole is located from liquid crystal molecules in a region where the electrodes are located;

wherein the spacer is disposed on a side of the color film substrate corresponding to a periphery of the through hole and facing the pixel electrode;

wherein the spacer is a box-shaped structure surrounding a periphery of the through-hole; and wherein the box-shaped structure is defined by four sides, and the four sides include the side facing the pixel electrode and the other three sides each having a hollow structure.

In the present disclosure, a liquid crystal display panel is provided, which includes a liquid crystal display includes a backlight module and a liquid crystal display panel. The liquid crystal display panel includes a color film substrate and an array substrate disposed opposite each other, wherein the array substrate includes a pixel electrode, a color resistance layer, and a thin film transistor, the color resistance layer is provided with a through hole, a drain of the thin film transistor is connected with the pixel electrode through the through hole, and a region corresponding to the through hole is provided with a spacer, which is configured to separate liquid crystal molecules in the region where the through hole is located from liquid crystal molecules in a region where the electrodes are located.

Compared with the prior art, in the present disclosure, the through hole is defined in the region in the color resistance layer where the pixel electrode is connected with the thin film transistor, and the spacer is disposed around the periphery of the through hole for separating the liquid crystal molecules in the region where the through hole is located from the liquid crystal molecules in a region where the pixel electrode is located. Therefore, the image retention and the dark shade are reduced, and the display quality is improved.

DETAILED DESCRIPTION OF THE PREFERRED EMBODIMENTS

The following description of the embodiments with reference to the accompanying drawings is used to illustrate particular embodiments of the present disclosure. The directional terms referred in the present disclosure, such as "upper", "lower", "front", "back", "left", "right", "inner", "outer", "side surface", etc., are only directions with regard to the accompanying drawings. Therefore, the directional terms used for describing and illustrating the present disclosure are not intended to limit the present disclosure.

In the figures, the modules with similar structures are denoted by the same reference numbers.

Figure 1A:
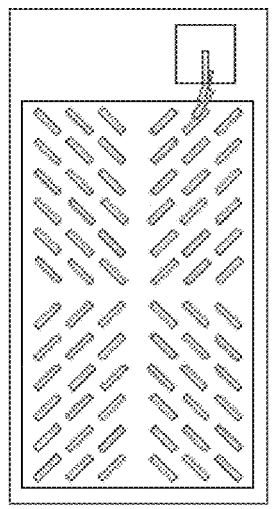
FIG. 1A is a view showing normal tilt of liquid crystal molecules when the liquid crystal display panel is in normal display.
Figure 1B:
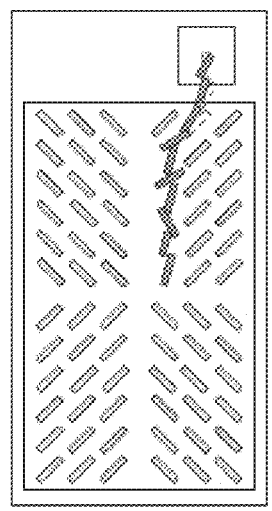
FIG. 1B is a view showing abnormal tilt of liquid crystal molecules when the liquid crystal display panel is in normal display.
Figure 1C:
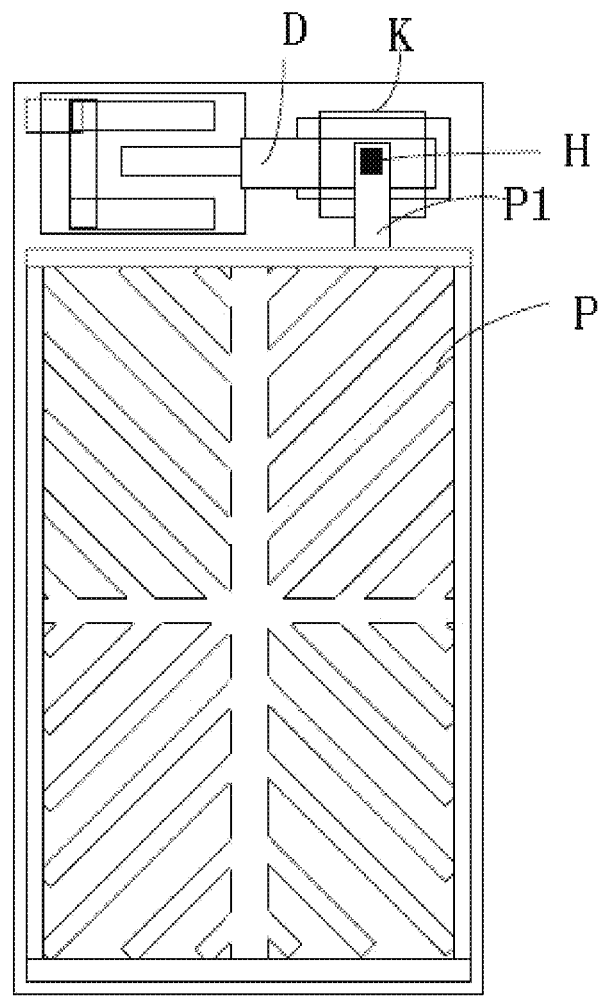
FIG. 1C is a plan view of an array substrate of a liquid crystal panel in a prior art.
Figure 2:
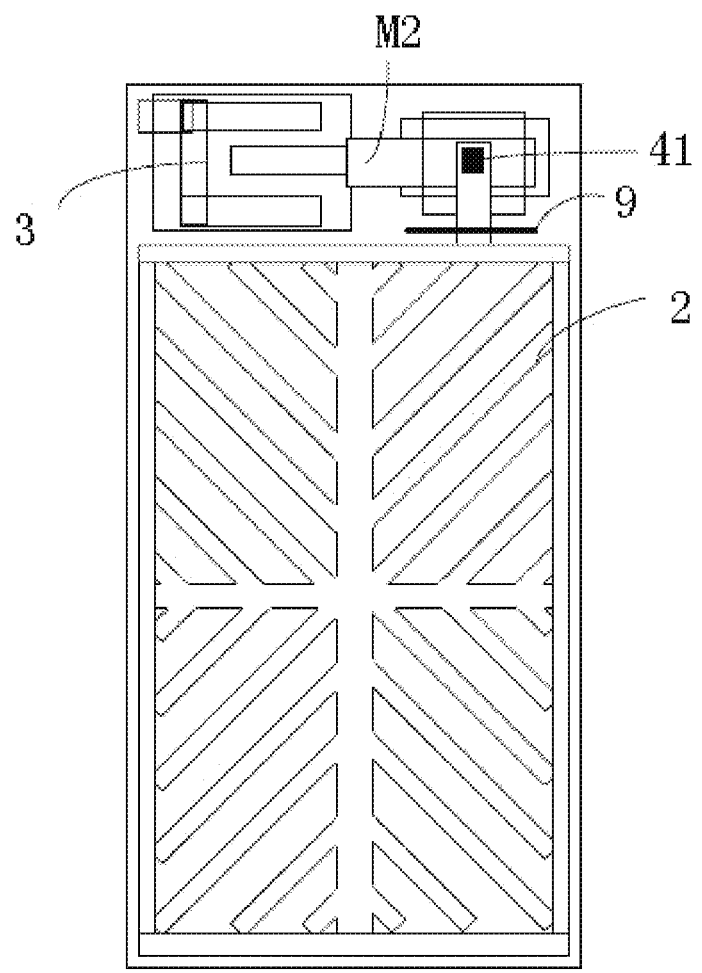
FIG. 2 is a plan view of an array substrate of a liquid crystal display panel in accordance with a preferred embodiment of the present disclosure.
Figure 4:
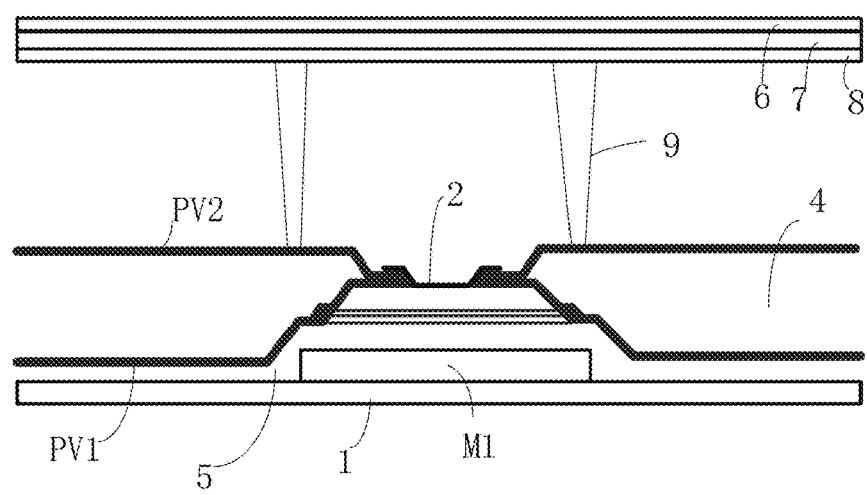
FIG. 4 is a partial structural view of a liquid crystal display panel in the present disclosure.

Refer to FIG. 2, which is a plan view of an array substrate of a liquid crystal display panel in accordance with a preferred embodiment of the present disclosure. The liquid crystal display panel includes an array substrate, a color film substrate, and a liquid crystal layer disposed between the array substrate and the color film substrate, as shown in FIG. 4. The array substrate includes a substrate 1, a pixel electrode 2, a thin film transistor 3, a first metal layer M1, a second metal layer M2 (including source and drain), a color resistance layer 4, an insulating layer 5, a passivation layer PV1 and a passivation layer PV2, as shown in FIG. 4.

Figure 3:
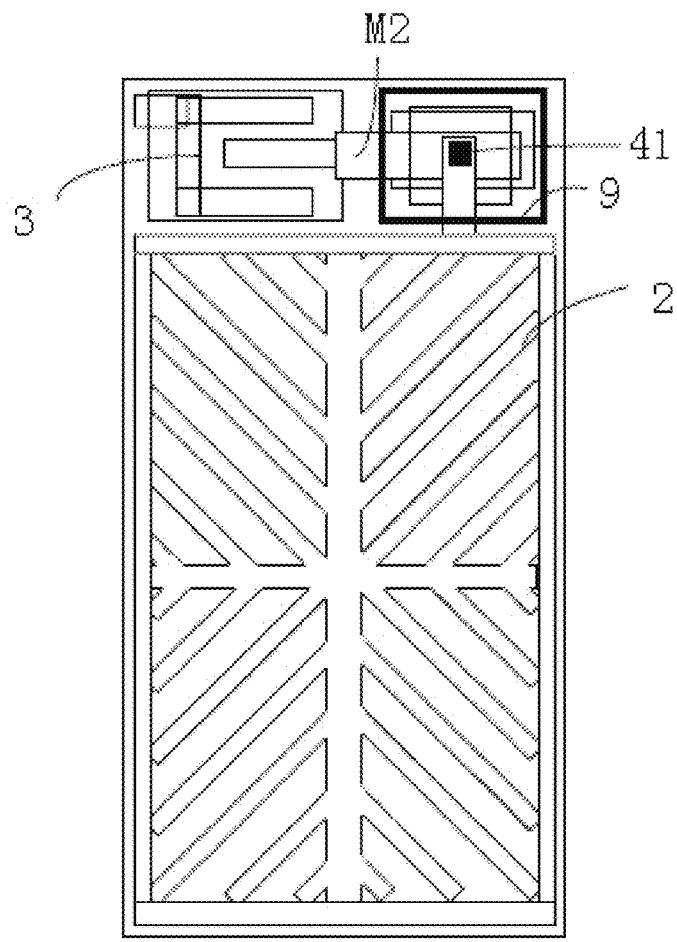
FIG. 3 is a plan view of an array substrate of another liquid crystal display panel in accordance with a preferred embodiment of the present disclosure.

Specifically, the color resistance 4 includes an RGB color resistance. The color resistance layer 4 is disposed on the passivation layer PV1, the passivation layer PV2 is disposed on the color resistance layer 4, and the drain of the thin film transistor 3 is connected with the pixel electrode 2. The color resistance layer 4 is provided with a through hole 41. The pixel electrode 2 is connected to an extension of the drain of the thin film transistor 3 (not shown) via an extension of the pixel electrode 2 (not shown) through the through hole 41, as shown in FIG. 2 and FIG. 3. Preferably, the pixel electrode 2 is a strip-like electrode (see FIG. 2).

Specifically, the color film substrate includes a substrate 6, a black matrix layer 7, and a common electrode layer 8. The black matrix layer 7 and the common electrode layer 8 are disposed on the substrate 6.

In the present embodiment, the liquid crystal display panel further includes a spacer 9 disposed on the region corresponding to the through hole 2 (e.g. around the periphery of the region where the through hole is located). The spacer 9 is configured to separate liquid crystal molecules in the region where the through hole 41 is located from liquid crystal molecules in a region where the pixel electrode 2 is located.

In the present embodiment, the spacer 9 is disposed on the color film substrate corresponding to the periphery of the through hole 41 for separating the liquid crystal molecules in the region where the through hole 41 is located from the liquid crystal molecules in the region where the pixel electrode 2 is located. When the panel is tapped, the liquid crystal molecules in the region where the through hole 41 is located and the liquid crystal molecules in a region where the pixel electrode 2 is located are not mutually affected. Therefore, the risks of the image retention and the dark shade are reduced, and the display quality is improved.

In a preferred embodiment of the present embodiment, the spacer 9 is a spacing structure between the array substrate and the color film substrate, and the spacer 9 not only spaces apart the liquid crystal molecules in the region where the through hole 41 is located from the liquid crystal molecules in a region where the pixel electrode 2 is located, but also serves as a spacer support between the array substrate and the color film substrate.

In a preferred embodiment of the present embodiment, the spacer 9 is disposed on a side of the color film substrate corresponding to a periphery of the through hole 41 and facing the pixel electrode 2, as shown in FIG. 2.

In a further preferred embodiment of the present embodiment, the spacer 9 may also be disposed on the array substrate and disposed around the periphery of the region where the through hole 41 is located. Furthermore, the spacer 9 is disposed on all of the passivation layers PV2, and is disposed around the periphery of the through hole 41.

Preferably, the spacer 9 may have a straight bar-like structure (i.e., a plate-like structure having a narrow width, as shown FIG. 2), or may have a structure of a curved surface having a certain thickness. The curvature and thickness of the structure of the curved surface vary depending on the actual size of the panel, without limitation thereto.

In a preferred embodiment of the present embodiment, the spacer 9 may also be a hollow columnar structure, which is disposed around the through hole 41. The columnar structure is preferably a cylindrical structure, and the cylindrical structure is hollow (e.g., a cylindrical annular structure) with the inner diameter being larger than the aperture diameter of the through hole 41.

In another preferred embodiment of the present embodiment, the top surface area of the hollow columnar structure is different from the bottom surface area thereof, and the minimum inner diameter of the columnar structure is larger than the aperture diameter of the through hole 41.

In another preferred embodiment of the present embodiment, the spacer 9 may also be a box-like structure disposed around the through-hole, as shown in FIG. 3. In particular, the box-like structure includes four sides (not shown) and is defined by the four sides. The four sides are disposed around the periphery of the through hole 41. The four sides include the side (not shown) facing the pixel electrode 2 and the other three sides (not shown) each having a hollow structure. The spacer 9 may also be of another irregular shielding plate structure, without limitation thereto.

In the present embodiment, the color resistance layer 4 is provided with a through hole 41 in the region where the pixel electrode 2 is connected with the drain of the thin film transistor 3. A spacer capable of separating the liquid crystal molecules in the region where the through hole 41 is located from the liquid crystal molecules in the display region is disposed around the periphery of the through hole 41. The spacer 9 is configured to separate the liquid crystal molecules in the region where the through hole 41 is located from the liquid crystal molecules in the region where the pixel electrode 2 is located, so that the liquid crystal molecules in the region where the through hole 41 is located and the liquid crystal molecules in a region where the pixel electrode is located are not mutually affected, the image retention and the dark shade are reduced, and the display quality is improved.

The present disclosure also provides a liquid crystal display comprising a backlight structure and a liquid crystal display panel. A conventional backlight structure is adopted as the backlight structure. The specific structure of the liquid crystal display panel is substantially equivalent to the structure of the liquid crystal display panel in the above embodiment. The specific structural description and the technical effects thereof are described with reference to the above-described embodiments, and will not be redundantly described here.

In the present embodiment, the color resistance layer 4 is provided with a through hole 41 in the region where the pixel electrode 2 is connected with the drain of the thin film transistor 3. A spacer disposed around the periphery of the region where the through hole 41 is located is capable of separating the liquid crystal molecules in the region where the through hole 41 is located from the liquid crystal molecules in the region where the pixel electrode is located, so that the liquid crystal molecules in the region where the through hole 41 is located and the liquid crystal molecules in a region where the pixel electrode 2 is located are not mutually affected, the image retention and the dark shade are reduced, and the display quality is improved.

In summary, although the preferable embodiments of the present disclosure have been disclosed above, the embodiments are not intended to limit the present disclosure. A person of ordinary skill in the art, without departing from the spirit and scope of the present disclosure, can make various modifications and variations. Therefore, the scope of the invention is defined in the claims.

What is claimed is:

1. A liquid crystal display panel, comprising:
a color film substrate and an array substrate disposed facing each other, wherein the array substrate includes a main pixel electrode, a color resistance layer, and a thin film transistor, wherein the main pixel electrode is separated from the thin film transistor, the main pixel electrode does not overlap the thin film transistor, the color resistance layer is provided with a through hole, the main pixel electrode is connected with a drain of the thin film transistor via a connector penetrating through the through hole, and a spacer separates liquid crystal molecules which are in and directly above the through hole from liquid crystal molecules which are directly on and above the main pixel electrode.

2. The liquid crystal display panel as claimed in claim 1, wherein the spacer is disposed on a side of the color film substrate corresponding to a periphery of the through hole and facing the pixel electrode.

3. The liquid crystal display panel as claimed in claim 2, wherein the spacer has a straight bar-like structure.

4. The liquid crystal display panel as claimed in claim 2, wherein the spacer has a structure of a curved surface.

5. The liquid crystal display panel as claimed in claim 1, wherein the spacer is a hollow columnar structure surrounding the through hole, and an inner diameter of the cylindrical structure is larger than a diameter of the through hole.

6. The liquid crystal display panel as claimed in claim 1, wherein the spacer is a hollow columnar structure surrounding the through hole, an area of an top surface of the columnar structure is different from an area of a bottom surface of the columnar structure, and a minimum inner diameter of the columnar structure is larger than a diameter of the through hole.

7. The liquid crystal display panel as claimed in claim 1, wherein the spacer is a box-shaped structure surrounding a periphery of the through-hole.

8. The liquid crystal display panel according to claim 7, wherein the box-shaped structure is defined by four sides, and the four sides include the side facing the pixel electrode and the other three sides each having a hollow structure.

9. The liquid crystal display panel as claimed in claim 1, wherein the spacer is disposed on the array substrate.

10. A liquid crystal display panel comprising:
a color film substrate and an array substrate disposed facing each other, wherein the array substrate includes a main pixel electrode, a color resistance layer, and a thin film transistor, wherein the main pixel electrode is separated from the thin film transistor, the main pixel electrode does not overlap the thin film transistor, the color resistance layer is provided with a through hole, the main pixel electrode is connected with a drain of the thin film transistor via a connector penetrating through the through hole, and a spacer separates liquid crystal molecules which are in and directly above the through hole is located from liquid crystal molecules which are directly on and above the main pixel electrode;
wherein the spacer is disposed on a side of the color film substrate corresponding to a periphery of the through hole and facing the pixel electrode;
wherein the spacer is a box-shaped structure surrounding a periphery of the through-hole; and
wherein the box-shaped structure is defined by four sides, and the four sides include the side facing the pixel electrode and the other three sides each having a hollow structure.

11. A liquid crystal display comprising: a backlight module and a liquid crystal display panel as claimed in claim 1.

* * * * *